3,445,195
Patented May 20, 1969

1

3,445,195
AFTERBURNER DEVICE FOR CATAYLTIC COM-
BUSTION OF COMBUSTIBLE COMPONENTS IN
THE EXHAUST GAS OF AN INTERNAL COM-
BUSTION ENGINE
Erich Benteler, Kusenweg, and Alfred Kretschmer, Biele-
feld, Germany, assignors to Benteler-Werke A.G.,
Bielefeld, Germany
Filed Mar. 3, 1965, Ser. No. 436,964
Claims priority, application Germany, Mar. 4, 1964,
B 75,712, B 75,713
Int. Cl. B01j 9/04
U.S. Cl. 23—288   14 Claims

ABSTRACT OF THE DISCLOSURE

A catalytic afterburner comprising a combustion cham-
ber with inlet and outlet passages having a common wall
for heat exchange and with igniting means surrounded by
catalyst.

The present invention relates to an afterburner device
for catalytic combustion of combustible components in
the exhaust gas of an internal combustion engine so as to
deodorize the exhaust gas and to free it from harmful or
noxious components before it is discharged to the atmos-
phere.

The percentage of combustible components, for in-
stance CO, in the exhaust gas of an internal combustion
engine varies greatly during the operation of an internal
combustion engine mounted for instance on an auto-
mobile and the percentage of the combustible compo-
nents in the exhaust gas may rise considerably due to
faulty mixture of gas and air fed to the internal combus-
tion engine, due to faulty adjustment of the carburetor
of the internal combustion engine, etc., and during such
rise of combustible components in the exhaust gas, the
temperature of the catalyst in an afterburner device for
the exhaust gas may be unduly raised so that the catalyst
may be destroyed or at least weakened in its efficiency,
whereas when the percentage of the combustible compo-
nents in the exhaust gas is reduced, the temperature of
the catalyst in the afterburner device may be reduced
correspondingly, lowering thereby the efficiency of the
catalyst so that only a partial, or no combustion of the
combustible components in the exhaust gas will take place
in the after burner device. Such a change in the catalyst
or the efficiency thereof will take place with any catalyst
known in the trade, for instance: an oxidation-catalyzer
consisting of an active material like oxide of aluminium
with metal, fixed by soaking or elutriating, like copper
nitrate, chrome acetate and nickel acetate. While damage
of the afterburner device will not take place when the
exhaust gas contains a very small percentage of combus-
tible components and while in this case only partial com-
bustion thereof is not too annoying, since such a small
percentage of the combustible components in the exhaust
gas will occur usually during high and constant speeds
of the combustion engine of the motor car, that is during
travel of the motor car along open roads, it has to be
considered that during sudden lowering of the speed of
the motor car the combustible components in the exhaust
gas will suddenly rise so that the catalyst has to be
brought in a very short time to its highest efficiency to
assure a perfect after burning of the exhaust gas. On the
other hand, if the percentage of the combustible compo-
nents in the exhaust gas suddenly rises, there is the dan-
ger that the afterburning device will be damaged through
excessive heating, which in turn may lead to a complete
destruction of the catalyst therein.

It is an object of the present invention to maintain the

2 temperature of the catalyst in an afterburner device for
catalytic combustion of combustible components in the
exhaust gas of an internal combustion engine within cer-
tain limits regardless of changes in the percentage of the
amount of combustible components in the exhaust gas.

It is a further object of the present invention to provide
for an afterburner device of the type mentioned in which
excessive heating of the catalyst in the afterburner de-
fice is positively prevented.

It is also an object of the present invention to provide
for an afterburner device of the type mentioned which
is composed of relatively few and simple parts so that
the afterburner device can be manufactured at reason-
able cost and will stand up trouble-free during extended
use.

With these objects in view, the afterburner device
according to the present invention mainly comprises com-
bustion chamber means, inlet passage means for feeding
exhaust gas of an internal combustion engine into said
combustion chamber means, outlet passage means for
discharging the gas from the combustion chamber after
the combustible components of the exhaust gas have been
burned therein. The inlet passage means and the outlet
passage means are arranged according to the present in-
vention to extend at least in part alongside each other
and they are in this part defined by common wall portions
so as to permit a heat exchange between the gas flowing
into the combustion chamber means and the gas flowing
out therefrom. The device includes further catalytic means
arranged in the combustion chamber means to be trans-
versed by the gases flowing therethrough, and igniting
means in the combustion chamber means and surrounded
by the catalytic means.

The heat created by the catalytic combustion of the
combustible components of the exhaust gas in the after-
burner device is thereby used according to the invention
to heat the exhaust gas entering in the device to maintain
thereby the temperature of the exhaust gases to be burned
substantially at the reaction temperature of the catalyst.

This will assure that the afterburner device will op-
erate properly during all operating conditions of the in-
ternal combustion engine, that is, the afterburner device
will also operate properly when the percentage of the
combustible components in the exhaust gas is relatively
small.

Preferably, the afterburner device includes also deflector
means around the igniting means for maintaining about
the igniting means a zone which is only to a minimum
extent traversed by the gas entering the combustion cham-
ber means through the inlet passage means.

Furthermore, the afterburner device according to the
present invention preferably includes also means for feed-
ing varying amounts of fresh air into the inlet passage
means, and/or means for discharging part of the exhaust
gas passing through the inlet passage means directly into
the outlet passage means so that this part will not pass
through the combustion chamber means. The means for
feeding fresh air into the inlet passage means or the
means for discharging part of the gas passing through the
inlet passage means into the atmosphere are preferably
automatically controlled by control means including an
element subjected to temperature variations of gas pass-
ing through the device so that the aforementioned means
are controlled in dependence on these temperature varia-
tions. This element of the control means may be arranged
in the combustion chamber means or in the outlet passage
means.

The arrangement of the deflector means about the
ignition means will have the advantage that a zone around
the ignition means will not be traversed by the main
stream of the exhaust gases entering the combustion chamber so that in this zone the catalyst will be cooled off only to a minimum extent to create thereby about the igniting means a zone in which the catalyst has a proper reaction temperature, whereas when the exhaust gas contains an excessive percentage of combustible components the feeding of fresh air into the inlet passage means will be automatically throttled, or part of the exhaust gas passing through the inlet passage means will be deflected automatically from the combustion chamber means so that the amount of heat created in the combustion chamber means due to combustion of exhaust gas passing therethrough will be automatically reduced, to prevent thereby excessive heating of the catalyst which may lead to a destruction of the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 4 and 5 are partial sectional views of different control arrangements for providing communication between the inlet passage means and the outlet passage means of the afterburner device according to the present invention; FIGS. 4 and 5 are drawn to a larger scale than the preceding figures;

FIGS. 6 and 7 are partial sectioned side views drawn to a larger scale and showing control arrangements for feeding varying amounts of fresh air into the inlet passage means of the afterburner device;

FIG. 8 is a partial sectional view of a detail of the device shown in FIG. 1 and FIG. 8 shows various arrangements of this detail;

FIG. 9 is a top view of the deflector means around the igniting means;

Figure 1:
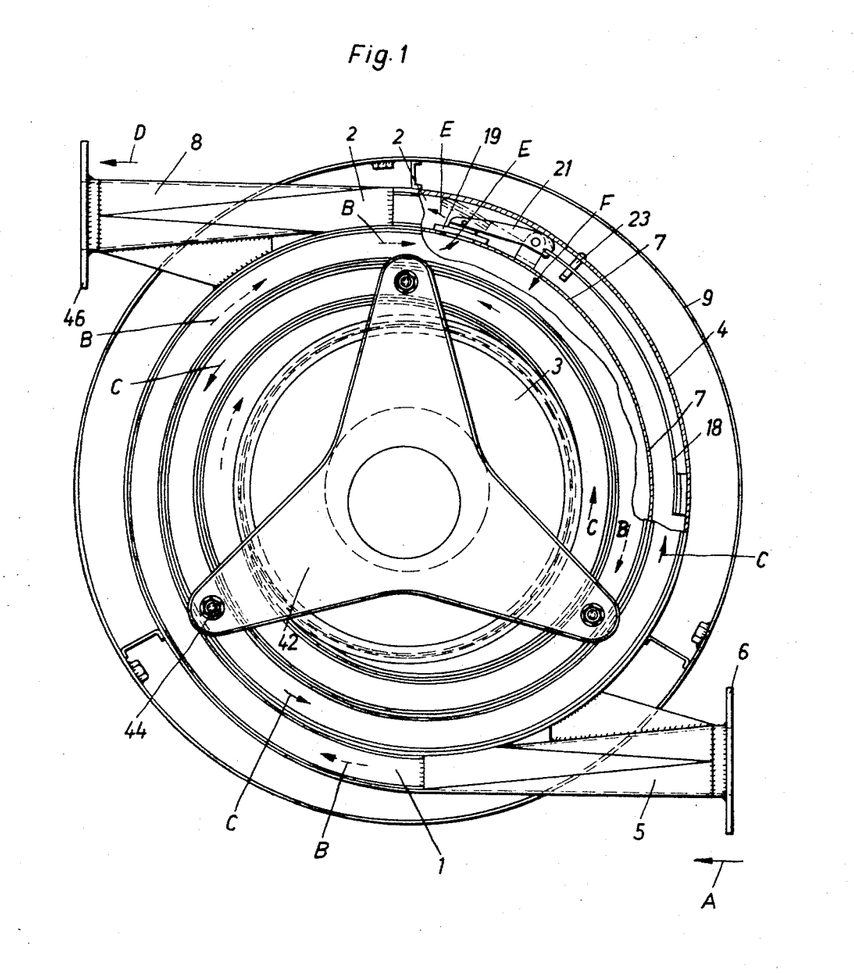
FIG. 1 is a partially sectioned front view of the afterburner device of the present invention.
Figure 2:
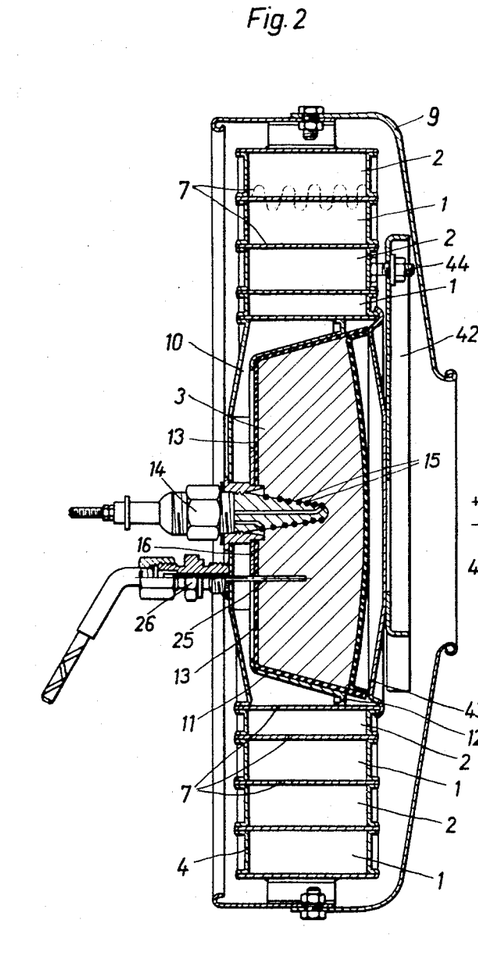
FIG. 2 is a sectional view of the afterburner device shown in FIG. 1.

Referring now to the drawings and more specifically to FIGS. 1 and 2 of the same, it will be seen that the afterburner device according to the present invention illustrated in these figures mainly comprises combustion chamber means 3, inlet passage means 1 for feeding exhaust gas of an internal combustion engine into the combustion chamber means, outlet passage means 2 for discharging the gas from the combustion chamber means after the combustible components of the exhaust gas have been burned therein, catalytic means arranged in the combustion chamber means 3 to be transversed by the exhaust gas flowing from the inlet passage means 1 through the combustion chamber means 3 into the exhaust passage means 2, and igniting means (FIG. 2) 14, 15 extending into the combustion chamber means 3 in contact with the catalytic means therein.

The exhaust gas coming from an internal combustion engine, not shown in the drawings, is first guided in a known manner through an exhaust conduit, also not shown in the drawings, to a part of a vehicle spaced from the internal combustion engine thereon, suitable to place the afterburner device thereon. To mount the afterburner device in close vicinity to the combustion engine is usually not possible, since there is usually not room enough for the afterburner device and since in this case the afterburner device would have to be constructed to fit in a very limited space and to be connectable directly to the exhaust gas discharge of the combustion engine, which would make an economic manufacture of the afterburner device in great series impossible. Mounting the afterburner device in a convenient space of the vehicle spaced from the internal combustion engine thereon requires a relatively long connecting conduit between the discharge end of the combustion engine and the inlet end of the afterburner device, which in turn will result in a considerable cooling of the exhaust gases before they enter into the afterburning device. The inlet and outlet passage means of the afterburner device of the present invention are, therefore, arranged to compensate for this heat loss of the exhaust gases before they enter into the afterburing device. In the arrangement shown in FIGS. 1 and 2 the inlet passage means and the outlet passage means 2 are arranged in the form of parallel spirals, as shown in FIG. 1, separated from each other by common wall portions 7. Thereby, a heat exchange will take place between the gas heated up by the catalytic combustion of the exhaust gas in the combustion chamber 3 and the exhaust gas entering the device through the inlet passage means 1 so that the exhaust gases before they enter the combustion chamber 3 are heated up to a temperature which is in the region of the reaction temperature of the catalyst in the combustion chamber 3.

The afterburner device illustrated in FIG. 1 is compactly constructed so that the actual device in its housing 4 has a cup-shaped appearance. The exhaust gases from the internal combustion engine are guided in the direction of the arrow A into the inlet socket 5 provided at its outer end with an annular flange 6 for connecting of the inlet socket to an exhaust conduit coming from the internal combustion engine. From the inlet socket 5 the exhaust gases pass through the spirally arranged inlet passage means 1 in the direction of the dotted arrows B, to pass subsequently through the catalyst in the combustion chamber 3 in which the combustible components of the exhaust gases are burned, and the hot gases from the combustion chamber 3 leave the latter through the likewise spirally arranged discharge passage 2 in the direction of the arrows C. A heat exchange will take place between the exhaust gases entering the device and the hot gases leaving the combustion chamber 3 due to the double spiral arrangement of the passage means 1 and 2, since these passage means are separated by common wall portions 7 which are formed from heat conducting material. After leaving the discharge passage 2, the gases will pass into the discharge socket 5 and leave the latter in the direction of the arrow D. An annular flange 46 is provided at the outer end of the discharge socket 8 which may be used to connect an additional conduit thereto leading to the rear end of the vehicle on which the combustion engine is mounted. To prevent radiation of heat to the body of the vehicle, it is preferred to enclose the housing 4 of the device illustrated in FIGS. 1–8 with a cup-shaped cover 9 which not only extends over the peripheral wall of the housing, but also at least in part over one end face thereof as clearly shown in FIG. 2.

The construction so far described is advantageous to maintain the temperature of the exhaust gas to be burned at the point of entrance into the combustion chamber 3 substantially in the region of the proper reaction temperature of the catalyst therein.

The combustion chamber means 3 of the afterburner device as shown in FIGS. 1 and 2 preferably include a container 13 of preferably frustoconical configuration as clearly shown in FIG. 2 and the end wall of the container 13 as well as the opposite end wall thereof are formed with closely spaced perforations therethrough. The two end walls may be formed from a wire mesh, or the whole container 13 may be formed from such wire mesh. The peripheral wall of the container 13 is surrounded by and covered by a correspondingly shaped housing member 11 open at opposite ends and having at its right end, as viewed in FIG. 2, a peripheral flange 12 fixed to the innermost of the walls 7. A wall extending spaced from and over the left wall of the container 13, as viewed in FIG. 2, defines in connection with the outer surface of the member 11 and part of the innermost wall 7 a central space 10 with which the inner end of the inlet passage means 1 communicates and from which exhaust gases pass through the perforated end wall of the container into the interior of the combustion chamber 3. A cover 43 engaging one end edge of the peripheral wall of the container 13 is spaced from the right wall of the container, as viewed in FIG. 2, and defines therewith a second central space with which the inner end of the outlet passage means 2 communicates. The exhaust gases entering the combustion chamber means 3 from the left thereof pass therefore in axial direction through the combustion chamber means and the catalyst arranged therein.

An igniting means 14 is arranged preferably along the axis of the combustion chamber means 3 protruding into the latter and the igniting means includes a glow spiral 15. The specific construction of the igniting means 14 does not form part of the present invention and the igniting means 14 with the glow spiral 15 thereon serves only to provide a heat source in the combustion chamber means. Deflector means preferably in the form of a deflector plate 16 are provided about the igniting means 14 at the side thereof where the exhaust gases enter into the combustion chamber 3, to provide about the igniting means 14 in the combustion chamber 3 a zone which is only to a minimum extent traversed by the exhaust gas entering into the combustion chamber means 3, to maintain at the downstream side of the deflector plate 16 a glowing cone which is not traversed by the main stream of the exhaust gases so that practically no heat will be withdrawn from this cone. Thereby a temperature is maintained in this zone which is within the reaction temperature of the catalyst in the combustion chamber means 3.

Figure 3:
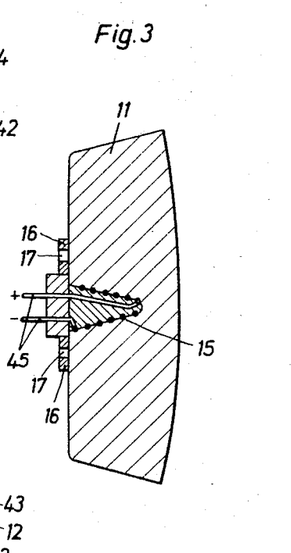
FIG. 3 is a sectioned detail of the afterburner device shown in FIG. 2.
Figures 7, 9:
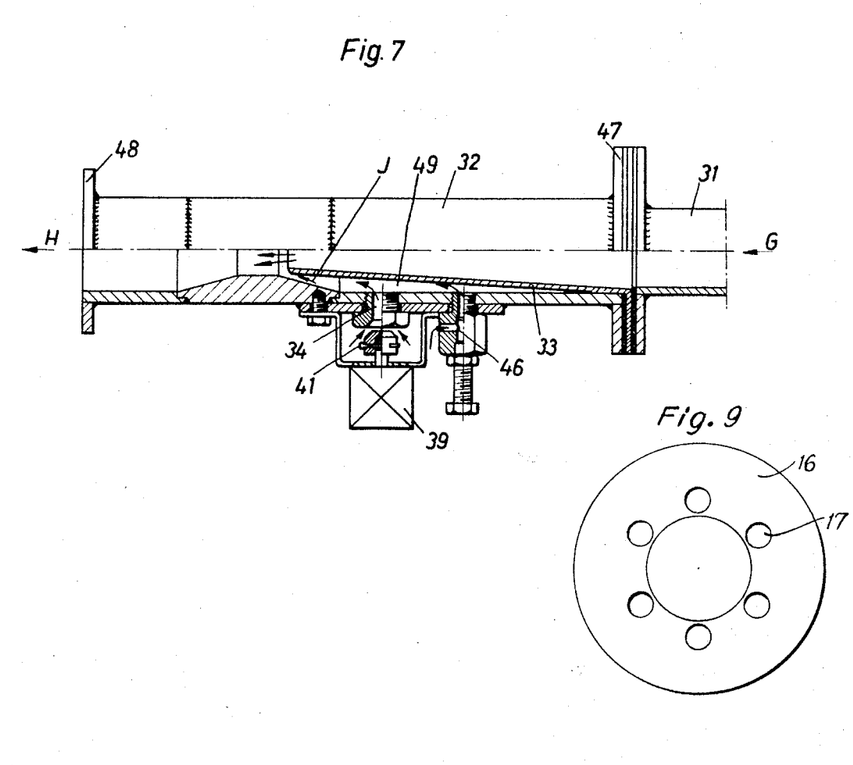

As shown in FIGS. 3 and 9, the deflector plate 16 may be provided with a plurality of angularly spaced openings or bores 17 therethrough. The shape of the openings 17 shown in FIG. 9 is not essential and, instead of cylindrical bores, slot shaped openings may also be used. The openings 17 will produce about the glow spiral 15 a secondary flow of exhaust gas and the combustible components of this secondary flow will be burned around the glow spiral 15 to produce the necessary heat to heat up the catalyst around the glow spiral 15. If the percentage of the combustible components in the exhaust gas diminishes, there will remain on the downstream side of the deflector plate 16 a heated up zone of the catalyst to maintain combustion of the combustible components of the exhaust gas and this zone will expand from the center depending on the percentage of the combustible components in the exhaust gas.

As mentioned before, it is an important object of the present invention to control the temperature of the catalyst in the combustion chamber means 3 in such a manner that on one hand at least part of the catalyst is maintained at a proper reaction temperature, and on the other hand that the catalyst is not heated up to such a temperature which would lead to the destruction of the same. While the deflector plate 16 will assure the maintenance of a properly heated portion of the catalyst at the downstream side of the deflector plate 16, additional means are necessary to prevent excessive heating of the catalyst when the exhaust gas contains a relatively high percentage of combustible components.

According to the present invention means are therefore provided which permit a controlled feed of fresh combustion air into the apparatus, and/or means are provided which permit to deflect at least part of the exhaust gases entering the device from the combustion chamber means 3.

Figures 4, 5:
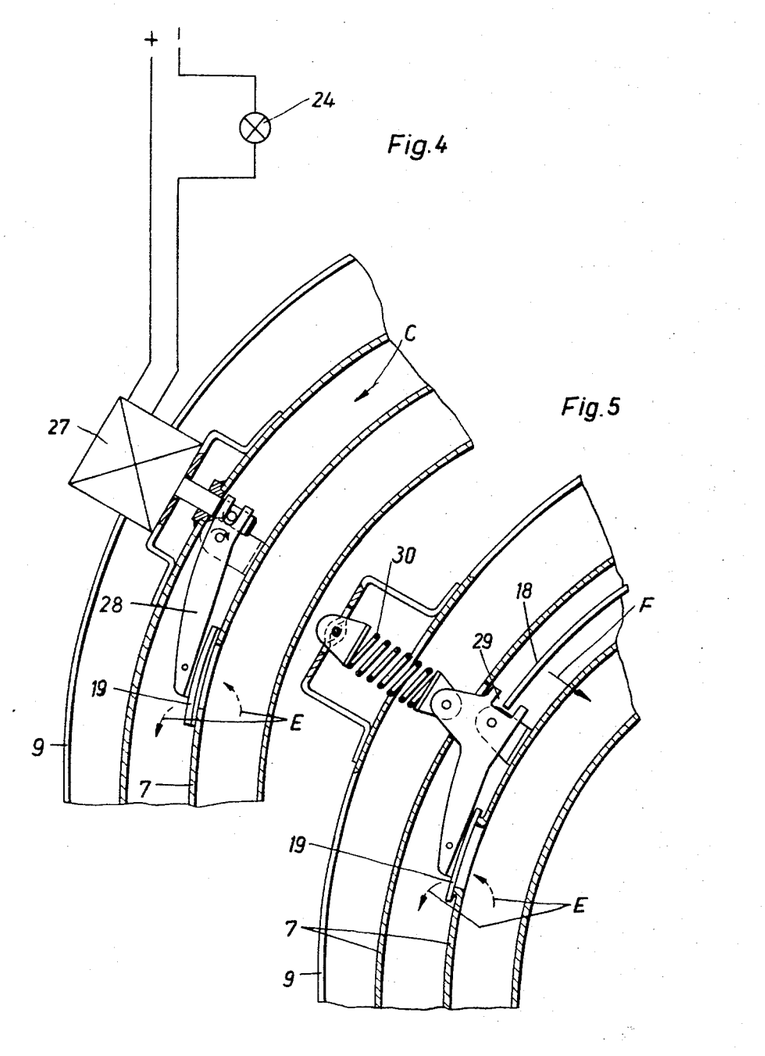

FIG. 1 shows one of various possible arrangements to prevent overheating of the catalyst in the combustion chamber. As shown in FIG. 1 an opening is provided through one of the walls 7 to provide communication between the inlet passage means 1 and the outlet passage means 2. The opening is controlled by a valve 19, preferably in the form of a flap valve, which is mounted at one end of a double armed lever 21 pivotally mounted between its ends. An elongated bimetallic strip 18 is fixed at one end thereof to one of the walls 7 and this bimetallic strip engages with the other end thereof the short arm of the lever 21, so that when the temperature of the gases passing through the discharge passage means 2 will surpass a predetermined temperature, the bimetallic strip 18 will bend in the direction as indicated by the arrow F to tilt thereby the lever 21 and to lift the valve 19 carried thereby from the full line position to the dash dotted line position shown in FIG. 1 to open thereby the opening in the wall 7 so that all or at least part of the exhaust gas passing through the inlet passage means 1 will pass in the direction of the arrows E through the opening directly into the discharge socket 8 of the discharge passage means 2. During its movement in the direction indicated by the arrow F, the bimetallic strip 18 will contact a contact 23 to close thereby a control circuit, not shown in FIG. 1, but similar to the control circuit shown in FIG. 4, to actuate a warning signal for instance an electric light 24, as shown in FIG. 4 which is preferably mounted on the dashboard of the vehicle. This indicates to the driver of the vehicle that the exhaust gases from the motor are not burned in the afterburner device and this indicates likewise to the driver a faulty adjustment of the motor or the carburetor thereof. This construction will therefore increase the efficiency of the vehicle, since it indicates an excessive percentage of combustible components in the exhaust gas which evidently is connected with an excessive use of gas fed to the motor.

FIGS. 4 and 5 show different modifications of flap valve controls. As shown in FIG. 4, a lever 28, pivotally mounted between its ends, supports at one end thereof the flap valve 19 arranged to open and close an opening formed in a wall 7 separating the inlet passage means 1 from the outlet passage means 2, so as to permit when the flap valve 19 is opened gas from the inlet passage means 1 to pass in the direction of the arrows E through the opening directly into the outlet passage means 2. Turning of the lever 28 in the embodiment shown in FIG. 4 is controlled by means of an electromagnet 27 operatively connected by a stem extending from the armature of the electromagnet to the short arm of the lever 28. The electromagnet 27 is controlled from a thermoelectric element 26 which has a finger 25 extending into the combustion chamber means 3 as shown in FIG. 2 and subjected to the temperature variations resulting from the combustion of the combustible components of the exhaust gases fed into the combustion chamber means 3. The thermoelectric element 26 is electrically connected to the electromagnet 27 shown in FIG. 4 and this connection may also include amplifier means to amplify the current produced by the thermoelectric element. When the temperature in the combustion chamber means 3 reaches a temperature in which danger of destruction of the catalyst therein exists, a current will be created in the thermoelectric element and the magnet 27 will be energized in such a manner that the latter will turn the lever 28 about its tilting axis to open the flap valve 19 causing thereby the exhaust gases passing through the inlet passage means 1 to pass at least in part in the direction of the arrow E into the exhaust passage means 2. Actuation of the electromagnet 27 will close also in a manner known per se a control circuit including the warning light 24 to indicate to the driver that at least part of the exhaust gases will not be burned in the combustion chamber 3 but pass directly into the atmosphere.

FIG. 5 shows a further modification of an arrangement for opening and closing the flap valve 19. The arrangement shown in FIG. 5 includes an elongated bimetallic strip 18 as shown in FIG. 1. However, in the arrangement shown in FIG. 5 one end of the bimetallic strip 18 is arranged in a cutout 29 provided in the short arm of the double armed lever carrying at the long arm thereof the flap valve 19. A compression spring 30 is arranged in the manner shown in FIG. 5 and engages the lever at a point thereof eccentrically with respect to and to one side of the pivot axis of the lever. In the position shown in FIG. 5 the compression spring 30 will tend to keep the flap valve 19 in the closed position. When the elongated bimetallic strip 18 curves in the direction of the arrow F the free end of the bimetallic strip 18 will engage the lower ones of the projections forming the cutout 29 to turn thereby the lever in clockwise direction about its pivot axis so that the connecting point between lever and compression spring 30 is moved to an over center position, that is to the outer side of the pivot axis, so that the compression spring 30 is free to expand and to open thereby the flap valve 19 suddenly to its full extent. During curving of the bimetallic strip 18 in the opposite direction an action opposite to the action above described will take place, so that the flap valve 19 will be suddenly closed. This arrangement will assure that the flap valve 19 is not gradually opened but opened only at the moment when the temperature of the gas discharged from the combustion chamber means 3 reaches a temperature in which the danger of destruction of the catalyst therein exists. Of course, the elongated bimetallic strip 18 has to be calibrated accordingly.

The present invention contemplates not only an arrangement for deflecting part or all of the exhaust gases from the combustion chamber means 3 to prevent thereby the destruction or reduction of the efficiency of the catalyst therein, but the present invention may also include an arrangement which prevents overheating of the catalyst in the combustion chamber means 3 by varying the feed of combustion air into the inlet passage means 1.

It is emphasized that either of the aforementioned arrangements or a combination thereof may be used according to the present invention.

Figures 6, 8:
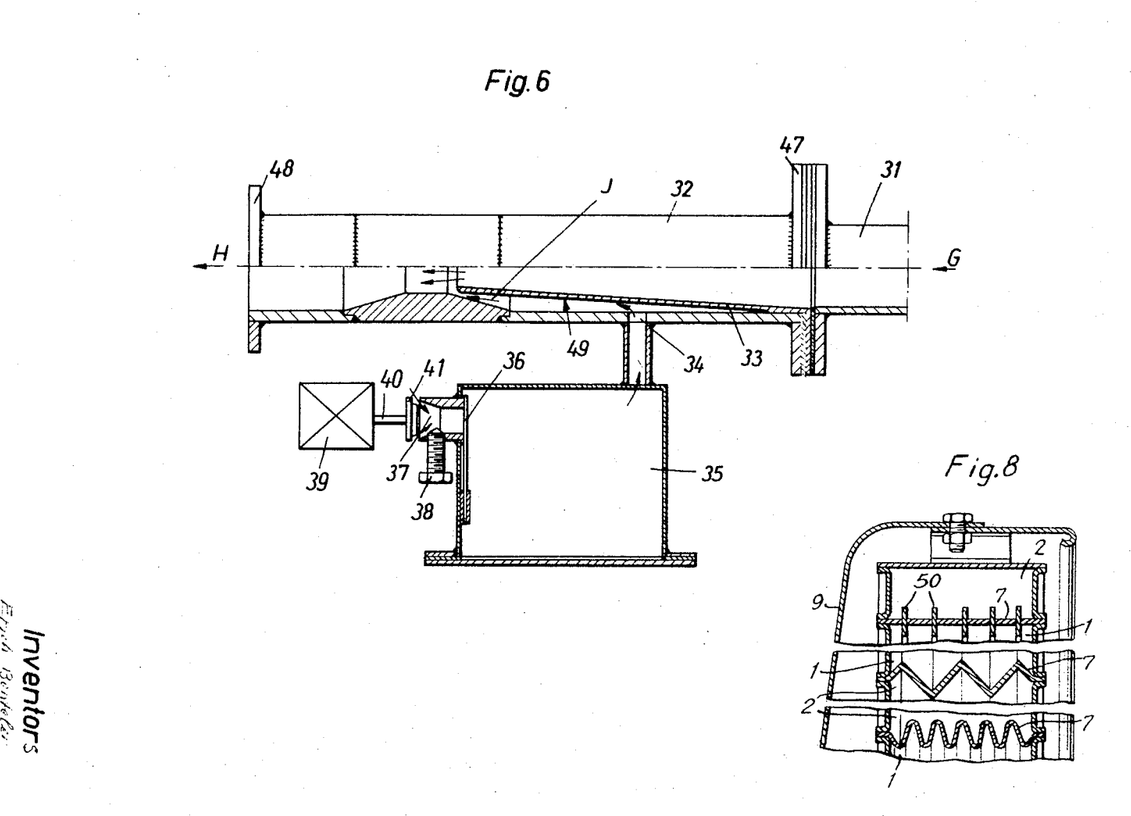

FIGS. 6 and 7 illustrate two different arrangements for varying the feeding of combustion air into the inlet passage means. The arrangement illustrated in FIG. 6 includes a conduit 32 having flanges 47 and 48 at opposite ends thereof permitting to connect the conduit 32 to the end of an exhaust conduit 31 coming from the exhaust of the combustion engine and to the flange 6 of the inlet socket 5 of the inlet passage means 1 of the afterburner device shown, for instance, in FIG. 1. The exhaust gas coming from the internal combustion engine will pass through the conduit 32 in the direction as indicated by the arrows G and H. An injection conduit 33 is located within the conduit 32 and connected by means of a flange at one end thereof to the flange 47 of the conduit 32 and the injection conduit 33 tapers in cross section from the connected end thereof towards the free ends thereof as shown in FIG. 6. The free end of the injection conduit 33 cooperates with a preferably reduced cross section of the conduit 32 to create during passage of exhaust gas through the conduit 32 a suction in the space 49 surrounding the injection conduit 33. The space 49 communicates with the interior of an equalizing chamber 35 having an opening 37 closed at its inner end by a portion of a leaf spring 36 affixed at one end thereof spaced from the opening to a wall of the equalizing chamber 35. If the suction created at the end of the injection conduit 33 is great enough, air will be sucked in the direction as indicated by the arrow J from the space 49 and from the equalizing chamber 35 to create in the latter a pressure less than atmospheric pressure so that the portion of the leaf spring 36 extending over the opening 37 will be inwardly deflected, opening thereby the opening and permitting air to pass through the equalizing chamber, the space 49 into the conduit 32 and from there into the inlet socket 5 of the inlet passage means 1 of the afterburner device. Adjusting means in the form of an adjusting screw 38 and extending into the short nipple defining the opening 37 permit to vary the open cross section thereof to regulate thereby the amount of air passing into the equalizing chamber 35 when the leaf spring 36 is disengaged from the inner end of the opening.

The outer end of the opening 37 is also closeable by a valve 41 arranged therein. Movement of the valve 41 is controlled by an electromagnet 39 having an armature, not shown in FIG. 6, connected by means of the rod 40 to the valve 41. The electromagnet is energized from a thermoelectric element as for instance shown at 25, 26 in FIG. 2, however, the finger 25 of the thermoelectric element does ont necessarily have to project into the combustion chamber means 3, but this finger may be arranged in any part of the afterburner device in which it is subjected to the temperature variations produced by the combustion of the combustible components of the exhaust gas in the combustion chamber means. The thermoelectric element and the magnet 39 connected thereto are calibrated in such a manner that when a danger of overheating the catalyst in the combustion chamber exists, the magnet 39 is energized to close thereby the valve 41, preventing suction of combustion air into the inlet passage means and throttling thereby automatically the combustion of the combustible components of the exhaust gas entering the afterburner device. Thereby, the temperature in the combustion chamber means 3 will automatically drop, which in turn will result in a deenergization of the magnet and reopening of the valve 41, for instance by a spring not shown in the drawing.

FIG. 7 shows a further arrangement for throttling feeding of combustion air into the afterburning device. The arrangement shown in FIG. 7 differs from that shown in FIG. 6 in that the equalizing chamber 35 is omitted in the arrangement illustrated in FIG. 7. In the arrangement shown in FIG. 7 the electromagnet 39 controlled and energized in the manner as described before is connected to a valve 41 so as to open and close the passage 34 providing communication between the outer atmosphere and the space 49 about the injection conduit 33. The arrangement shown in FIG. 7 includes further an additional air passage 46 providing communication between the outer atmosphere and the space 49 and the flow of air through this additional air passage 46 may also be regulated by adjusting means in the form of an adjusting screw. The action of the injectors shown in FIGS. 6 and 7 may be increased, or the injectors shown in these figures may be replaced by a motor driven blower not shown in the drawings.

The arrangement shown in FIGS. 1 and 2 has various advantages. The arrangement of the catalyst in a sieve-like container in the housing 11 is especially advantageous especially, if the pot shaped housing is arranged in the center of the afterburner device. The flange 12 on the housing 11 separates the spaces at opposite ends of the combustion chamber means 3 from each other. The use of the sieve-like container 13 permits an easy exchange of the catalyst when such an exchange is necessary. The housing 11 provides for a perfect seat of the sieve-like container 13 therein, whereas a star shaped clamping member 42 cooperates with the cover 43 engaging the end edge of the peripheral wall of the container 13 to maintain the container properly seated in the housing 11. The star shaped clamping member 42 is held in place by three bolts 44, as shown in FIGS. 1 and 2, so that by unscrewing the nuts on the bolt 44, the clamping member 42 and the cover may be removed, after removal of the outer housing 9, so that the container 13 with the catalyst therein may be removed from the device to be cleaned or be replaced by a new one. A further advantage of the arrangement shown in FIGS. 2 and 3 is that the spiral 15 of the igniting means 16 is arranged directly in the catalyst so that, as schematically illustrated in FIG. 3, the granulated catalyst may sinter and be baked together with the end of the igniting means extending into the catalyst 11 to form one unit with the portion of the igniting means extending into the catalyst. In his case he ends of the glow spiral 15 are preferably arranged to project in form of two tongues 45 beyond the deflector plate 16 to be engaged by a corresponding plug forming part of the igniting means 14.

It is also possible to increase the heat exchange between the passage means 1 and 2 by increasing the heat exchange surfaces of the walls 7 by forming the wall 7 in a corrugated manner as shown schematically in dash-dotted lines in FIG. 2. FIG. 8 shows various arrangements for the construction of the separating walls 7. The various arrangements shown in FIG. 8 may be used on adjacent separating walls, however, it has to be understood that each of the arrangements shown in FIG. 8 may also be used for all of the separating walls 7 separating the passage means 1 from the passage means 2. As shown in the upper part of FIG. 8 the separating wall 7 may be provided with short ribs 50 extending spaced from each other and transverse to the separating wall 7 to opposite sides of the latter. The middle part of FIG. 8 shows an arrangement in which the separating wall 7 comprises adjacent portions arranged at an angle with respect to each other so as to increase the exchange surface of the separating wall. Finally, the bottom part of FIG. 8 illustrates an arrangement in which the separating wall 7 is formed from a corrugated sheet metal member to increase the heat exchange surface.

Figure 10:
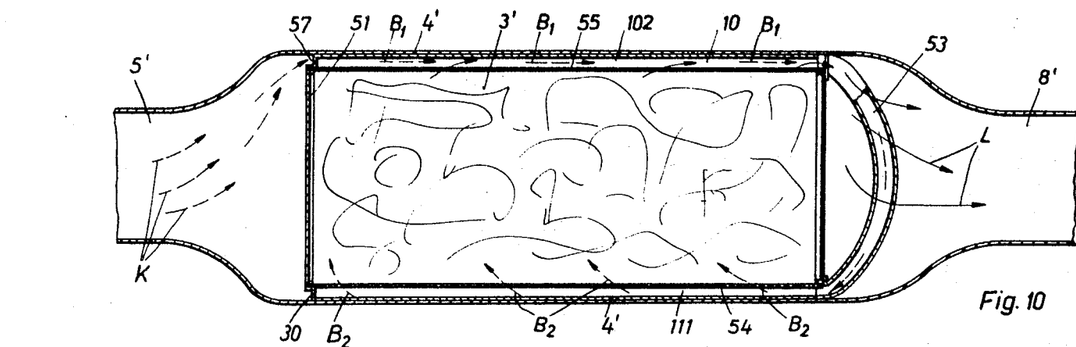
FIG. 10 is a longitudinal cross section through another afterburner device according to the present invention.
Figure 11:
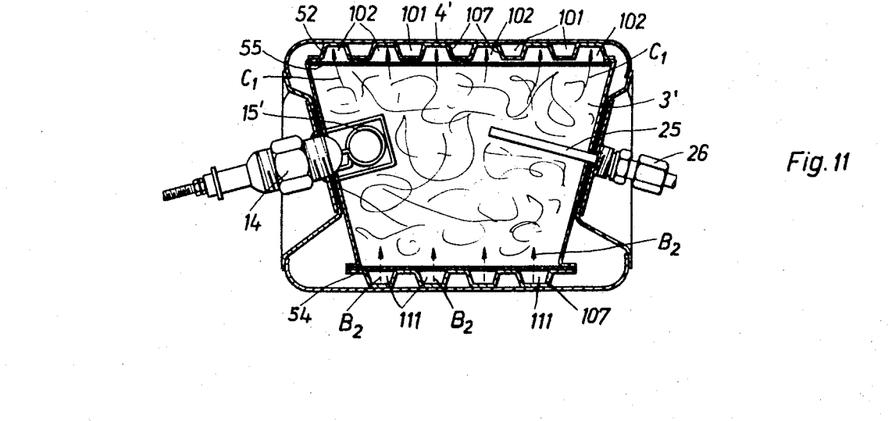
FIG. 11 is a transverse cross section through the afterburner device shown in FIG. 10.

FIGS. 10 and 11 illustrate a simplified arrangement of an afterburning device according to the present invention. The afterburner device illustrated in FIGS. 10 and 11 includes an outer substantially tubular housing 4' having an inlet end portion 5' of a cross section smaller than that of the main portion of the outer housing 4' and an outlet end portion 8' likewise of reduced cross section. The inlet end portion 5' is connected to the exhaust conduit of an internal combustion engine so that the exhaust gases will enter into the housing 4' as indicated by the arrows K and leave the latter in the direction indicated by the arrows L.

A combustion chamber means 3' is arranged in the housing 4'. The combustion chamber means 3' has a solid front wall 51 facing the inlet passage end portion 5' of the outer housing and at its opposite end likewise a solid end wall. The top wall 55 of the housing is formed with a plurality of closely spaced perforations therethrough, and this wall may be formed from a wire mesh. Likewise, the bottom wall 54 of the combustion chamber means 3' is formed with a plurality of closely spaced perforations therethrough and this bottom wall may likewise be formed from a wire mesh. The top and bottom walls of the conbustion chamber means 3' are respectively spaced from and face corresponding wall portions of the outer housing 4'. Arranged in this space between the top wall 55 of the combustion chamber means 3' and the corresponding elongated wall portion of the outer housing 4' is a corrugated sheet metal member 107 as shown in FIG. 11 forming thereby in the aforementioned space adjacent alternating passages 101 and 102. The ends of the passages 102 facing the inlet end portion 5' of the outer housing 4' are respectively closed by wall portions 57 which wall portions extend also through any space between the side walls of the combustion chamber means 3' and the outer housing 4' so that the exhaust gases entering the outer housing through the inlet end portion 5' can pass only through the passages 101 in the direction as indicated in FIG. 10 by the dotted arrows B₁. Curved conduits 53, extending spaced from each other through the discharge end portion 8' of the outer housing, connect respectively the rear ends of the passages 101 with corresponding passages 111 formed by a corrugated sheet metal member arranged in the space between the bottom wall 54 of the combustion chamber means 3' and the corresponding wall portion of the outer housing 4' as clearly shown in FIG. 11. The passage means 111 are open toward the bottom wall 54 of the combustion chamber means 3' formed by a wire mesh so that the exhaust gases passing through the passages 101, the connecting conduits 53 into the passages 111 may pass through corresponding portions of the wire mesh forming the bottom wall 54 into the interior of the combustion chamber means 3' in which a catalyst is located so that the exhaust gases will pass in upward direction through the catalyst and through the wire mesh forming the top wall 55 of the combustion chamber means into the passage means 102, which are open toward the top wall 55, as clearly shown in FIG. 11. The gases entering into the passage means 102 will leave the latter through the open rear ends of the passage means 102 to pass across the space between the connecting conduit 53 in the direction as indicated by the arrows L into the outlet end portion 8' of the outer housing and from there into the atmosphere. The passage means 111 are closed at the front end thereof by wall portions 30 as clearly shown in FIG. 10.

The wire mesh forming the bottom wall 54 will prevent entrance of granulated catalyst into the passages 111, while at the same time permitting the gas in the passage means 111 to pass in the direction of the arrows B₂ into the interior of the combustion chamber means 3'. The exhaust gases entering the combustion chamber means 3' are completely burned therein and the hot gases leave the combustion chamber means in the direction as indicated by the arrows C₁ into the passage means 102. The hot gases leaving the combustion chamber means 3' pass through the passage means 102 in the embodiment illustrated in FIGS. 10 and 11 in the same direction as the exhaust gases pass through the passage means 101, whereas the hot gases leaving the passage means 102 will pass through the connecting conduits 53 in a direction transverse to the elongation of the connecting conduits.

The arrangement illustrated in FIGS. 10 and 11 includes also an igniting means 14 as shown in FIG. 11 having a glow spiral extending into the interior of the combustion chamber means 3'. The glow spiral 15' shown in FIG. 11 is of slightly different construction as the glow spiral 15 shown in FIGS. 2 and 3. An arrangement as shown in FIGS. 6 or 7 may also be provided upstream of the inlet passage portion 5', and in this case the arrangement may also include a thermoelectric element 26 having a finger 25 extending into the interior of the combustion chamber means 3'. The wall portions of the corrugated sheet metal member 107 separating the passage means 101 and 102 from each other permit heat exchange between the gases respectively passing through the passage means 101 and 102 and such heat exchange may be improved by providing ribs on said wall portions as shown in the upper portion of FIG. 8. However, the arrangement shown in FIG. 11 is especially advantageous from the view point of production cost.

The passages 1 and 2 shown in FIGS 1 and 2 as well as the passages 101, 102, 53 and 111 are preferably of uniform cross section at least through a major portion of the length thereof and the cross sections of the passages successively traversed by the gases are also preferably equal, an arrangement which has proven especially advantageous for the proper heat exchange between adjacent passages.

It will be understood that each of the elements described above, or two or more together, may also find a useful application in other types of afterburner devices for catalytic combustion of combustible components of exhaust gases of an internal combustion engine differing from the types described above.

While the invention has been illustrated and described as embodied in an afterburner device for catalytic combustion of the combustible components of exhaust gases including means for maintaining the temperature of the catalyst in the device within a predetermined temperature range it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An afterburner device for catalytic combustion of combustible components in the exhaust gas of an internal combustion engine comprising, in combination, combustion chamber means; inlet passage means for feeding exhaust gas of an internal combustion engine into said combustion chamber means; outlet passage means for discharging the gas from the combustion chamber means after the combustible components of the exhaust gas have been burned therein, said inlet passage and outlet passage means extending at least in part alongside each other and being in said part defined by common wall portions so as to permit a heat exchange between the gas flowing into the combustion chamber means and the gas flowing out therefrom; igniting means in said combustion chamber means; catalytic means arranged in said combustion chamber means to be traversed by the exhaust gas fed thereinto and surrounding at least part of said igniting means; and deflector means around said igniting means for maintaining about said igniting means a zone which is only to a minimum extent traversed by the gas entering said combustion chamber means through said inlet passage means.

2. An afterburner device as set forth in claim 1, wherein said deflector means is constituted by a plate surrounding said igniting means and extending substantially normal to the axis thereof, said plate being formed with a plurality of angularly spaced openings therethrough.

3. An afterburner device as set forth in claim 1, wherein said igniting means includes a glow spiral arranged in said combustion chamber means and having a pair of ends projecting to the outside of said combustion chamber means, and plug means cooperating with said ends for releasably connecting a source of electric energy to said glow spiral.

4. An afterburner device for catalytic combustion of combustible components in the exhaust gas of an internal combustion engine comprising, in combination, combustion chamber means; inlet passage means for feeding exhaust gas of an internal combustion engine into said combustion chamber means; outlet passage means for discharging the gas from the combustion chamber means after the combustible components of the exhaust gas have been burned therein, said inlet and outlet passage means being arranged in form of parallel spirals about said combustion chamber means and having common wall portions so as to permit a heat exchange between the gas flowing into the combustion chamber means and the gas flowing out therefrom; igniting means in said combustion chamber means; and catalytic means arranged in said combustion chamber means to be traversed by the exhaust gas fed thereinto and surrounding at least part of said igniting means.

5. An afterburner device as set forth in claim 4 and including housing means at least in part surrounding said spirally arranged passage means to limit heat convection from said passage means to the outer atmosphere.

6. An afterburner device as set forth in claim 4, wherein said common wall portions are formed from material having a high heat conducting capacity.

7. Afterburner device as set forth in claim 6 and including projecting ribs on said wall portion formed from said material.

8. An afterburner device as set forth in claim 6, wherein said common wall portions have successive portions inclined at an angle with respect to each other to increase the heat conducting surface thereof.

9. An afterburner device as set forth in claim 6, wherein said common wall portions are formed by a corrugated sheet metal member to increase the heat conducting surface thereof.

10. An afterburner device for catalytic combustion of combustible components in the exhaust gas of an internal combustion engine comprising, in combination, combustion chamber means; inlet passage means for feeding exhaust gas of an internal combustion engine into said combustion chamber means; outlet passage means for discharging the gas from the combustion chamber means after the combustible components of the exhaust gas have been burned therein, said inlet passage and outlet passage means extending at least in part alongside each other and being in said part defined by common wall portions so as to permit a heat exchange between the gas flowing into the combustion chamber means and the gas flowing out therefrom; igniting means in said combustion chamber means; catalytic means arranged in said combustion chamber means to be traversed by the exhaust gas fed thereinto and surrounding at least part of said igniting means; an opening in one of said common wall portions and providing communication between said inlet passage means and said outlet passage means at a location spaced from said combustion chamber means; valve means movable between an open and a closed position and cooperating with said opening for closing and opening the same; and control means including a lever mounted in said outlet passage means for tilting about a tilting axis and supporting said valve means, resilient means engaging said lever at a point to one of said tilting axis, and a bimetallic strip fixed at one end in said outlet passage means and having another end located in a cutout of said lever so as to engage the latter when said bimetallic strip curves due to temperature variations of the gas passing through said outlet passage means to tilt said lever to a position in which said point of engagement of said spring moves from said one to the other side of said tilting axis to thereby suddenly open said valve means between said positions thereof in dependence on the temperature of the gas passing through said outlet passage means.

11. An afterburner device as set forth in claim 10 and including indicating means cooperating with said valve means for indicating the position thereof.

12. An afterburner device for catalytic combustion of combustible components in the exhaust gas of an internal combustion engine comprising, in combination, combustion chamber means; inlet passage means for feeding exhaust gas of an internal combustion engine into said combustion chamber means; outlet passage means for discharging the gas from the combustion chamber means after the combustible components of the exhaust gas have been burned therein, said inlet passage and outlet passage means extending at least in part alongside each other and being in said part defined by common wall portions so as to permit a heat exchange between the gas flowing into the combustion chamber means and the gas flowing out therefrom; igniting means in said combustion chamber means; catalytic means arranged in said combustion chamber means to be traversed by the exhaust gas fed thereinto and surrounding at least part of said igniting means; air passage means providing communication between said inlet passage means and the outer atmosphere, said air passage means including a feed conduit for feeding exhaust gas into said inlet passage means, an injection conduit extending through said feed conduit and having a downstream end of reduced diameter so that the gas flowing through said injection conduit will create a suction in a space about said downstream end thereof, an equalizing chamber means communicating with said space having an opening communicating with the atmosphere, a leaf spring fixed at one end thereof to said equalizing chamber means and extending with a portion thereof over said opening, said leaf spring being resiliently movable between a closed position and an open position in which said portion thereof is spaced from said opening, said leaf spring being biased so as to tend to stay in said closed position and being movable to said open position when the pressure in said equalizing chamber means is reduced due to suction created in said space below atmospheric pressure; a conduit extending outwardly from said opening; and adjusting means for adjusting the open cross section of said last mentioned conduit.

13. An afterburner device as set forth in claim 12 and including valve means for closing and opening the outer end of said conduit, and control means for controlling said valve means at said outer end of said conduit and including a thermoelectric element located in said combustion chamber means, and moving means mechanically connected to said valve means and electrically connected to said thermoelectric element.

14. An afterburner device for catalytic combustion of combustible components in the exhaust gas of an internal combustion engine comprising, in combination, combustion chamber means; inlet passage means for feeding exhaust gas of an internal combustion engine into said combustion chamber means; outlet passage means for discharging the gas from the combustion chamber means after the combustible components of the exhaust gas have been burned therein, said inlet passage and outlet passage means extending at least in part alongside each other and being in said part defined by common wall portions so as to permit a heat exchange between the gas flowing into the combustion chamber means and the gas flowing out therefrom; igniting means in said combustion chamber means; catalytic means arranged in said combustion chamber means to be traversed by the exhaust gas fed thereinto and surrounding at least part of said igniting means; a feed conduit for feeding exhaust gas into said inlet passage means; an injection conduit in said feed conduit and having a downstream end of reduced diameter so that the gas flowing through said injection conduit will create a suction in a space about said downstream end thereof; a first and an additional air passage providing communication between said space and the outer atmosphere; valve means cooperating with said air passage for opening and closing the latter; adjustable means in said additional air passage for adjusting the open cross section thereof; and control means operatively connected to said valve means for controlling the same, said control means including a thermoelectric element located in said combustion chamber means, and electromagnetic moving means mechanically connected to said valve means and electrically connected to said thermoelectric element.

References Cited

UNITED STATES PATENTS

| | | |
|---|---|---|
| 3,172,738 | 3/1965 | Houdry. |
| 3,186,807 | 6/1965 | Bolek. |
| 3,197,956 | 8/1965 | Clarke et al. ________ 60—30 |
| 3,201,206 | 8/1965 | Wawrziniok. |
| 3,215,507 | 11/1965 | Horstmann et al. |
| 3,220,805 | 11/1965 | Fowler et al. |
| 3,248,872 | 5/1966 | Morrell. |

JOSEPH SCOVRONEK, *Primary Examiner.*